April 25, 1944.   J. T. NEISWINTER ET AL   2,347,497
DAMPING MEANS FOR CURRENT RESPONSIVE APPARATUS
Filed Sept. 6, 1941
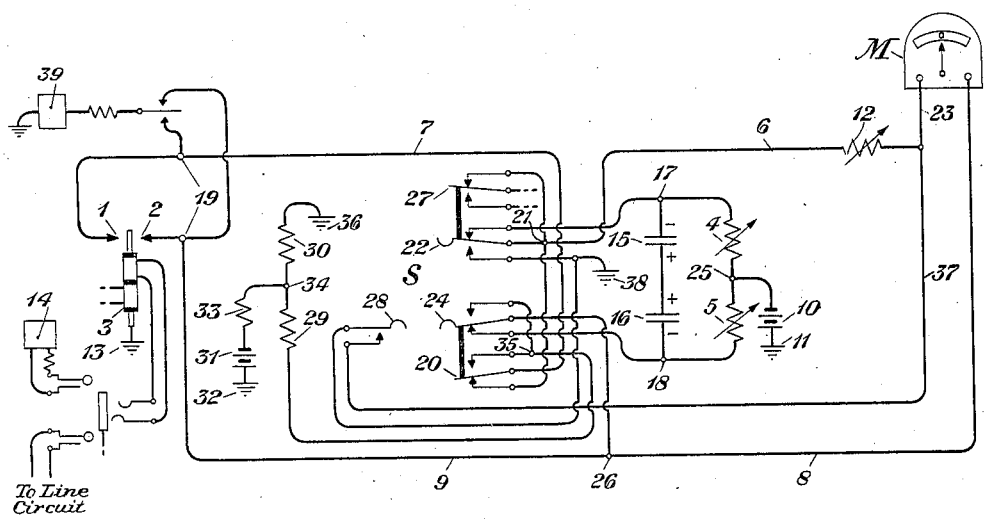
INVENTORS
J.T. Neiswinter and
O.P. Horsey
BY W. Clark Floyd
ATTORNEY Patented Apr. 25, 1944

2,347,497

UNITED STATES PATENT OFFICE 2,347,497

DAMPING MEANS FOR CURRENT RESPONSIVE APPARATUS

James T. Neiswinter, South Orange, N. J., and Oliver P. Horsey, Cleveland, Ohio, assignors to American Telephone and Telegraph Company, a corporation of New York Application September 6, 1941, Serial No. 409,872

13 Claims. (Cl. 178—69)

This invention relates to damping means and more particularly to means for damping current responsive apparatus when varying current is transmitted therethrough.

It is frequently desirable to measure such a current or some particular characteristic or component thereof or some particular characteristic of apparatus causing a variation of current from its normally steady condition or from its normally uniform rate of variation. Difficulty has been experienced, however, in reading the indication given by the measuring device due to the fact that the needle or indicator vibrates in response to the current variations. If, for example, a source of direct current potential is connected to the measuring circuit and the polarity thereof periodically reversed, the meter needle will be "kicked" to one side of the zero point on the meter dial and then to the other in accordance with the polarity reversals, the arc of vibration being dependent, among other things, upon the magnitude of the current and the frequency of the reversals. Where the rate of reversal is sufficiently low to permit the needle to follow the reversals but sufficiently high to prevent the eye from following the needle vibration, as where the rate of reversals is in the neighborhood of 50 times per second or less, it is quite difficult to take even an approximate reading and almost impossible to take an accurate one.

In the past, efforts have been made to overcome this difficulty by mechanically damping the meter needle, e. g., by associating a vane therewith and enclosing both in an air chamber. Damping methods of this type involve making the meter sluggish in operation, i. e., reducing the response thereof to the entire composite current transmitted therethrough. Since the composite current includes the component or components desired to be measured, such methods inherently involved reducing the sensitivity and accuracy of the meter with respect to the measurement of said component. In other words, damping was obtained at the sacrifice of sensitivity and accuracy of measurement. Incorporating the damping means in the meter itself has the further disadvantage that the meter after being damped cannot be used for making measurements where damping is unnecessary or undesirable, nor can the damping effect be varied to meet varying damping requirements. Efforts have also been made to overcome the difficulty by connecting an ordinary mica condenser across the terminals of the meter. However, due to the comparatively small capacity per unit size of mica condensers, the damping effect produced thereby was so small that the arrangement was limited in its practical application either to the measurement of current having a high rate of variation (where little or no damping is required) or to cases in which it was permissible to employ comparatively high voltages and resistances in association with the condenser (where less capacity is required for a given damping effect). Even in the latter case it was found in practice that the arrangement generally had to be supplemented by the employment of mechanical damping means incorporated in the meter, which resulted in the disadvantages pointed out above.

One of the objects of the present invention is to provide improved damping means for devices which normally respond to varying current or to the components thereof. A second object is to provide compact, efficient, and inexpensive means for readily and accurately measuring, as desired, varying current or the characteristics or components thereof, or the characteristics of apparatus causing the variation of said current, regardless of the magnitude of the voltages employed or the rate of said variation and without appreciably reducing the sensitivity of the measuring device. A third object is to provide an improved measuring circuit for measuring bias in telegraph apparatus and signals. A fourth object is to provide variable damping means so that the damping effect can be readily varied to meet different damping requirements. A fifth object is to provide damping means which can be readily associated with the current responsive apparatus when the damping thereof is desired and dissociated therefrom when such damping is not desired. Other objects and features of the invention will be apparent from the description hereinafter following.

In general the invention consists, among other things, in providing a circuit through which varying current is transmitted and which includes electrolytic condenser means bridged across the current responsive device, and means for preventing the passage through said bridge of any direct current component that might be present in said current and in arranging the above mentioned elements and any resistances in the circuit so as to obtain a high degree of damping. A feature of the invention is the employment of a pair of oppositely poled electrolytic condensers in said bridge for purposes hereinafter pointed out.

The invention is illustrated in the drawing as being embodied in a system for measuring telegraph signal bias and relay bias, contact resistance and other relay characteristics. As shown, the meter M is a low resistance direct current ammeter. It is so designed that when no current is transmitted through its winding the pointer or needle is normally in its mid or zero position and swings to the right or left to a degree depending upon the direction and magnitude of the current through said winding, and is preferably so calibrated as to indicate percentage of marking and spacing bias. When it is desired to measure signal bias or relay bias, switch S is operated to the position shown whereupon the terminals of the meter are connected to contacts 1 and 2 of relay 3, and resistances 4 and 5, preferably of equal magnitude, are bridged across conductors 6—7 and 8—9 which extend from the meter terminals to the relay contacts. One terminal of the source 10 is connected to the bridge at a point between said resistances and the other terminal to ground at 11. A third resistance 12 is connected in series with conductor 6 and, when switch S is in the position shown, in series with the meter winding. When signal bias is to be measured, the operating winding of relay 3, shown as a polar relay, may be associated directly or indirectly with the line circuit over which the signals to be measured are transmitted and operates in response thereto, thus causing the armature to be operated alternately against contacts 1 and 2. This connects ground 13 alternately to conductors 7 and 9 and causes current first in one direction and then in the opposite direction to be transmitted through said conductors. When relay bias is to be measured, the operating winding of the relay to be measured, for example relay 3, is connected to a variable current source 14 of such character as will cause the armature of said relay to vibrate between contacts 1 and 2, preferably at a rate approximately the same as that at which it vibrates when in actual use. If, for example, its rate of vibration when in actual use is 20 times per second, an alternating current source of 20 cycles per second can be used for this purpose. This would produce a corresponding rate of current reversals through conductors 7 and 9. The current which is thus periodically reversed may be considered as a composite current made up of a series of alternating current components. If in each cycle of reversals the current in one direction is transmitted for a longer interval of time than in the opposite direction, there will also be present in said composite current a direct current component which is either positive or negative, depending upon whether the positive current is transmitted for a longer interval than the negative current or vice versa. If said current is transmitted in each direction for equal lengths of time, no direct current component will be present. If relay 3 is biased either to marking or to spacing (i. e., if its armature remains on its marking contact 1 for a longer interval of time than on its spacing contact 2, or vice versa), both alternating current components and a direct current component will be present. In such case, it is this direct current component which is the measure of the relay bias and the one desired to be measured by meter M and it is the alternating current components which, if no damping means are provided, would cause the undesired "kicking" or vibration of the meter needle that prevents the eye from determining the response of the meter to the direct current component. For the purpose of damping out, so far as meter M is concerned, the undesired components of these current reversals, condenser means of high capacity is bridged across the meter terminals. In order to obtain a sufficiently high capacity for this purpose, commensurate with practical limitations as to the size and cost of the condenser means, electrolytic condenser means is employed since such condensers afford high capacity per unit size and per unit cost. However, this type of condenser has certain polar characteristics which should be taken into account, viz., the characteristic that the film on what is known as the positive plate acts more efficiently as a dielectric when positive voltage is applied to that plate and the characteristic that said film conducts electricity, although presenting some resistance thereto, when negative voltage is applied to said plate. Hence, the most effective results from the electrolytic condenser means are obtained by associating therewith means of opposite polar characteristics, especially where current reversals are produced in the measuring circuit which may have either positive or negative direct current components. While this latter means may assume other and different forms, the arrangement shown in the drawing is a particularly advantageous one. There, a pair of oppositely poled electrolytic condensers 15 and 16 of relatively high capacity are connected in the bridge circuit in series with each other. In this arrangement, when point 17 becomes positively charged with respect to point 18, condenser 15 acts somewhat as a resistance while condenser 16 acts as a highly efficient condenser of large capacity. Thus upon this direction of current flow the condenser bridge serves to by-pass substantially all the alternating current components, but blocks the passage of any direct current components from point 17 to point 18 and, in effect, directs the latter components through the meter winding. Conversely, when point 18 becomes positively charged with respect to point 17, condenser 16 acts somewhat as a resistance while condenser 15 acts as a highly efficient condenser of large capacity and the condenser bridge, while by-passing the alternating current components as before, blocks the passage of any direct current components from point 18 to point 17. As a result the direct current component, if any, and from a theoretical viewpoint only that component, is transmitted through the meter winding and hence the meter gives a steady indication of any bias that is present. If for any reason it is desired to measure the alternating current components separately, additional measuring apparatus adapted to this purpose may be connected in the condenser bridge. It might also be pointed out at this point that, in view of the above described functioning of the condensers, the connection thereof in series with each other does not decrease the effective capacity of the bridge as would normally be the case and that the effective capacity of said bridge is substantially equivalent to the capacity of one of them.

If, for making measurements or for other purposes, it should be desired to associate a variable current source directly with the device to be damped, a source such as that shown at 14 may be connected directly to terminals 19. In such case, resistances 4 and 5, source 10 and ground 11 may be omitted. Also, a grounded variable current source such as that shown at 39 may be connected directly to either of terminals 19. In this case, source 10 may be omitted and ground 11 connected directly to point 25, or said source and resistances 4 and 5 omitted and ground 11 connected directly to point 17 or point 18 depending upon which of terminals 19 are connected to source 39.

The operation of the system when employed for making relay bias measurements will now be described. Let it be assumed that the relay to be measured is a polar telegraph relay of the type shown at 3. The contacts of the relay are connected to conductors 7 and 9 at terminals 19, its armature is grounded as at 13, a variable current source 14 (in this case a 20-cycle alternating current source) is connected to its operating winding and switch S is operated to the position shown in the drawing. The relay armature will then be operated against its contacts at the rate of 20 times per second. When it is against contact 1, which may be considered the marking contact, the circuit may be traced from ground at 13 through the armature, contact 1, conductor 7, switch arm 20 and the lower contact of said arm to point 21, where it divides into two parallel branches. One branch consists of switch arm 22, its upper contact and resistance 4. The other consists of conductor 6, resistance 12, conductor 23, the meter winding, conductor 8, switch arm 24, its lower contact and resistance 5. The two branches join at point 25 and the circuit continues to the negative terminal of source 10 which is grounded at 11. When the relay armature is operated against contact 2 the circuit may be traced from ground 13 through the relay armature, contact 2 and conductor 9 to point 26, where it again divides into two parallel branches, one consisting of switch arm 24, its lower contact and resistance 5, and the other consisting of conductor 8, the meter winding, conductor 23, resistance 12, conductor 6, point 21, switch arm 22, its upper contact and resistance 4. The branches join at point 25 as before. In both cases condensers 15 and 16 remain bridged across the parallel branches between points 17 and 18 or in effect across the meter terminals.

To obtain the most efficient damping action it is advantageous to connect condensers 15 and 16 and resistances 4, 5 and 12 in the location shown in the drawing, i. e., to connect resistances 4 and 5 in a bridge across the meter between its terminals and the local source and condensers 15 and 16 in a bridge across said meter between said resistance bridge and said terminals with resistance 12 connected in series with the meter at a point between said condenser bridge and said terminals. With these elements so arranged the damping effect is proportional to the product of the capacity in the condenser bridge and the effective resistance, the latter being equal to the product of the resistances on both sides of the condenser bridge divided by the sum thereof. These resistances are shown as being variable resistances so that with a given capacity, a given voltage for source 10 and a given fundamental frequency of the alternating current components, the damping effect may be varied to meet different damping requirements that might be encountered in making the various types of measurements of which the system is capable while at the same time maintaining the meter current at the desired maximum. For example, decreasing the magnitude of resistance 12, while proportionately increasing that of resistances 4 and 5, will decrease the effective resistance factor of the damping effect and hence the damping effect itself, but would not affect the desired maximum in the meter current.

The magnitude of the condenser capacity and that of the respective resistances depend, upon other things, on the type of measurement to be made, the amount of damping desired, the voltage of the local source and the desired current maximum through the meter. It has been found that for making bias measurements of telegraph relays with a 4-ohm 25 mil ammeter and with a local current source of 24 volts, substantially steady meter indication is given when the capacity of each of condensers 15 and 16 is 900 microfarads and when the resistance of each of resistances 4 and 5 is adjusted to be 600 ohms and that of resistance 12 to be 356 ohms. It is to be understood, however, that these values are given entirely for the purpose of illustration and are not to be taken as limiting in any way the scope of the invention.

As stated above, one of the features of the invention is to provide damping means which can be readily associated with the current responsive apparatus when the damping thereof is desired and dissociated therefrom when such damping is not desired. In the drawing there is shown, in addition to the above described apparatus, apparatus and circuit means adapted particularly for making contact resistance measurements of telegraph relays where no damping is required and switching means for dissociating the bias measuring circuits and damping means from the system and for connecting in place thereof the apparatus and circuit means adapted particularly for measuring contact resistance. When it is desired to use the system for the latter purpose, switch S is operated so that switch arms 22, 27 and 28 are operated to their lower positions and switch arms 20 and 24 to their upper positions. This disconnects bridging resistances 4 and 5, condensers 15 and 16 and source 10 from the circuit and closes a shunt circuit around resistance 12. It also disconnects conductor 7 from conductor 6 and connects it to conductor 9, thus interconnecting contacts 1 and 2; connects resistance 29, said interconnected contacts and the grounded relay armature in a circuit parallel to the circuit which includes resistance 30 and ground 36; and in effect bridges the meter across said interconnected contacts on the one hand and said relay armature on the other. In some cases, where appropriate voltage or resistance adjustments are made, the parallel branch including resistance 30 may be omitted from the circuit. If there is no appreciable contact resistance, the contact circuit will shunt the meter winding and the meter indication will be zero. If there is appreciable contact resistance, a current the magnitude of which depends upon the amount of the contact resistance will flow through the meter winding and cause a corresponding deflection of the needle. During the travel time of the armature between its contacts, current tends to flow through the meter winding in the same direction as that in which it flows when contact resistance is present. However, due to the fact that the travel time of the armature is short compared to the time it is against its contacts, the vibration of the needle caused thereby is small and in general does not substantially interfere with the reading of the meter. In order to obtain the best results as respects accuracy and sensitivity when making this type of measurement, the magnitude of the resistance in the parallel branch which includes the interconnected relay contacts and in the bridge which includes the meter, should in general be comparatively small. It has been found that for making contact resistance measurements of telegraph relays, accurate results may be obtained with a 4-ohm 25 mil ammeter and a 24-volt local current source when resistance 33 is a 426-ohm resistance and each of resistances 29 and 30 is a 100-ohm resistance. It is to be understood, however, that these values are given entirely for the purpose of illustration and are not to be taken as limiting in any way the scope of the invention.

While the invention has been shown and described as applied to systems for measuring telegraph signal and relay bias and contact resistance of such relays, it should be understood that it is capable of other uses and applications, without departing from the spirit thereof or the scope of the appended claims.

What is claimed is:

1. In combination, a potential source of variable polarity, a current responsive device, a circuit for associating said current responsive device with said potential source, and damping means associated with said current responsive device for damping the response thereof to current reversals, said damping means including a plurality of oppositely poled electrolytic condensers bridged across said current responsive device and resistance means connected in said circuit on each side of said bridge and the ratio of the effective capacity in microfarads of said condensers to the effective resistance in ohms of said resistance means being of the order of or greater than unity.

2. In combination, a source of alternating current having a direct current component, a meter associated with said source, and means, including a plurality of oppositely poled electrolytic condensers bridged across the terminals of said meter and resistance means connected on each side of said condenser bridge, for by-passing substantially all of the alternating current components of said current through said bridge and for transmitting said direct current component through said meter to actuate it, the ratio of the effective capacity in microfarads of said condensers to the effective resistance in ohms of said resistance means being of the order of or greater than unity.

3. In a system for measuring bias of telegraph signals, the combination with a source of such signals, of a meter, a circuit for associating said meter with said source of signals, means responsive to said signals for producing current reversals in said circuit corresponding to said signals and means, including a plurality of oppositely poled electrolytic condensers bridged across said meter and resistance means connected on each side of said condenser bridge, for causing the response of said meter to the variations of said current caused by bias in said signals and for damping the response of said meter to other variations of said current caused by said signals, the ratio of the effective capacity in microfarads of said condensers to the effective resistance in ohms of said resistance means being of the order of or greater than unity.

4. In a system for measuring relay bias, the combination with a relay to be measured, of a meter, a circuit, including current supply means, for associating said meter with the armature and contacts of said relay, means for causing the armature of said relay to operate alternately against said contacts and reverse the direction of the current in said circuit, and means, including a plurality of oppositely poled electrolytic condensers bridged across said meter and resistance means connected on each side of said condenser bridge, for causing the response of said meter to the variations of said current resulting from bias in the relay and for damping the response of said meter to other variations of said current, the ratio of the effective capacity in microfarads of said condensers to the effective resistance in ohms of said resistance means being of the order of or greater than unity.

5. In a system for measuring relay bias, the combination with a relay to be measured, of a meter, a circuit, including current supply means, for associating said meter with the armature and contacts of said relay, a current source of a uniform rate of variation for causing said armature to operate alternately against said contacts and cause currents of equal magnitude to flow alternately in opposite directions in said circuit, and means for damping the response of said meter to the current reversals and causing the response thereof to any component of the currents in said circuit resulting from bias in said relay, said damping means including a plurality of oppositely poled electrolytic condensers bridged across said circuit at a point intermediate said meter and said current supply means and resistance means connected in said circuit on each side of said condenser bridge.

6. In a system for measuring relay bias, the combination with a relay to be measured, of a meter, a circuit, including current supply means, for associating said meter with the armature and both contacts of said relay, means for causing the armature of said relay to operate alternately against said contacts and reverse the direction of the current in said circuit, means, including a plurality of oppositely poled electrolytic condensers bridged across said meter, for causing the response thereof to variations of said current resulting from bias in the relay and for damping the response of said meter to other variations of said current, and variable resistance means connected in said circuit on each side of said condenser bridge for varying the damping effect produced on the response of said meter by said condensers while limiting the current through said meter to a predetermined maximum.

7. In a system for measuring relay bias, the combination with a relay to be measured, of a direct current ammeter, a circuit interconnecting said ammeter and the armature and both contacts of said relay, a pair of resistances of the order of 600 ohms each connected in said circuit across said ammeter, a source of current of the order of 24 volts connected in said circuit between said relay armature and a point intermediate said pair of resistances, a third resistance of the order of 356 ohms connected in said circuit between said ammeter and one of said pair of resistances, a source of alternating current of a frequency of the order of 20 cycles per second associated with said relay for causing the armature thereof to operate alternately against said contacts and cause current to flow alternately in opposite directions through said circuit, and a pair of oppositely poled electrolytic condensers of the order of 900 microfarads each bridged across said ammeter at a point between said pair of resistances and said third resistance, said condenser means and said resistances cooperating functionally to by-pass the alternating current components of said current through said condenser bridge and to transmit through said ammeter any direct current component of said current resulting from bias in said relay and said resistances cooperating functionally to limit the magnitude of the current through said ammeter to a maximum of the order of 25 mils.

8. In combination, a source of potential of varying polarity, a current responsive device associated therewith and adapted normally to respond to said polarity variations, a pair of resistances connected between said source and said current responsive device, means bridged across said current responsive device at a point intermediate said pair of resistances for damping the response of said current responsive device to said polarity variations, said damping means including means having substantial capacity when a potential of one polarity is impressed thereon and functioning as a resistance when a potential of the opposite polarity is impressed thereon, the ratio of said capacity in microfarads to the effective resistance in ohms of said pair of resistances being of the order of or greater than unity, and means associated with said bridge to prevent the passage of direct current therethrough when said last-mentioned means functions as a resistance.

9. In combination, a source of potential of varying polarity, a current responsive device associated therewith and adapted normally to respond to said polarity variations, a pair of resistances connected between said source and said current responsive device, and means bridged across said current responsive device at a point intermediate said pair of resistances for damping the response of said current responsive device to said polarity variations, said damping means including means having substantial capacity when a potential of one polarity is impressed thereon and functioning as a resistance when a potential of the opposite polarity is impressed thereon and additional means functioning as a resistance when a potential of said first-mentioned polarity is impressed thereon and having substantial capacity when a potential of said opposite polarity is impressed thereon, the ratio of said capacity in microfarads to the effective resistance in ohms of said pair of resistances being of the order of or greater than unity.

10. In combination, a current source, a current responsive device associated therewith, a circuit interconnecting said current source and said current responsive device, means for periodically reversing the direction of current through said circuit, and means, including a plurality of oppositely poled electrolytic condensers bridged across said current responsive device and resistance means connected on each side of said condenser bridge, for by-passing the alternating current components and preventing the passage of any direct current components of said current through said bridge, the ratio of the effective capacity in microfarads of said condensers to the effective resistance in ohms of said resistance means being of the order of or greater than unity.

11. In a system for measuring bias of telegraph signals, the combination with a source of such signals, of a meter, a circuit for associating said meter with said source of signals, means responsive to said signals for causing currents of equal magnitude and corresponding to said signals to flow alternately in opposite directions in said circuit, and means, including a plurality of oppositely poled electrolytic condensers bridged across said meter and resistance means connected on each side of said condenser bridge, for causing the response of said meter to the variations of said currents caused by bias in said signals and for damping the response of said meter to other variations of said currents caused by said signals.

12. In a system for measuring relay bias, the combination with a relay to be measured, of a meter, a circuit, including current supply means, for associating said meter with the armature and contacts of said relay, means for causing the armature of said relay to operate alternately against said contacts and cause currents of equal magnitude to flow alternately in opposite directions in said circuit, and means, including a plurality of oppositely poled electrolytic condensers bridged across said meter and resistance means connected on each side of said condenser bridge, for causing the response of said meter to the variations of said currents resulting from bias in the relay and for damping the response of said meter to other variations of said currents.

13. In a system for measuring relay bias, the combination with a relay to be measured, of a meter, a circuit interconnecting said meter and both contacts of said relay, a pair of equal resistances connected across said meter, a source of current connected between the armature of said relay and a point intermediate said pair of resistances, a third resistance connected in said circuit between said meter and one of said pair of resistances, means for causing the armature of said relay to operate alternately against said contacts and reverse the direction of current in said circuit, and a pair of oppositely poled electrolytic condensers bridged across said meter at a point between said pair of resistances and said third resistance, said condenser means and said resistances cooperating functionally to cause the response of said meter to the variations of said current resulting from bias in the relay and to damp the response of said meter to other variations of said current.

JAMES T. NEISWINTER.
OLIVER P. HORSEY.